United States Patent
Guzik et al.

(10) Patent No.: US 11,438,514 B1
(45) Date of Patent: Sep. 6, 2022

(54) PERFORMING IMAGE COLLECTION ADJUSTMENT WITHIN A BODY-MOUNTED CAMERA

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, Taipei (TW); WHP Workflow Solutions, Inc., North Charleston, SC (US)

(*) Notice: Subject to any disclaimer, the term of this patent is extended or adjusted under 35 U.S.C. 154(b) by 0 days.

(21) Appl. No.: 17/328,940

(22) Filed: May 24, 2021

(51) Int. Cl.
 *H04N 5/232* (2006.01)
 *H04N 7/01* (2006.01)

(52) U.S. Cl.
 CPC ..... *H04N 5/23299* (2018.08); *H04N 5/23229* (2013.01); *H04N 7/01* (2013.01)

(58) Field of Classification Search
 CPC .. H04N 5/23299; H04N 5/23229; H04N 5/77; H04N 7/01; H04N 19/70; H04N 19/597
 See application file for complete search history.

(56) References Cited

U.S. PATENT DOCUMENTS

| | | | | |
|---|---|---|---|---|
| 11,106,928 B2* | 8/2021 | Wang | | F16M 11/10 |
| 11,265,469 B1* | 3/2022 | Gangwal | | H04N 5/23258 |
| 2008/0137922 A1* | 6/2008 | Catallo | | G16H 40/63 |
| | | | | 382/128 |
| 2012/0019660 A1* | 1/2012 | Golan | | H04N 5/23267 |
| | | | | 348/E7.085 |
| 2015/0109436 A1* | 4/2015 | Chen | | H04N 5/77 |
| | | | | 348/143 |

* cited by examiner

*Primary Examiner* — Hung H Lam
(74) *Attorney, Agent, or Firm* — Han Santos, PLLC

(57) ABSTRACT

Described herein are techniques that may be used to provide automatic adjustment of image selection for image generation. In some embodiments, such techniques may comprise receiving, at an image capture device, raw image data that comprises information about a number of pixels, receiving, at the image capture device, sensor data comprising information about a position of the image capture device, determining, based at least in part on the received sensor data, an offset value, selecting, based on the determined offset value, a portion of the raw image data to be included within an image, and generating the image from the portion of the raw image data.

17 Claims, 5 Drawing Sheets

PERFORMING IMAGE COLLECTION ADJUSTMENT WITHIN A BODY-MOUNTED CAMERA

BACKGROUND

In recent years, a number of events have highlighted the need for increased recordkeeping for law enforcement officers. This need pertains to both evidentiary collection as well as protecting the public from potential abuses by a police officer and protecting the police officer from false accusations of abuse. Law enforcement has previously used various camera devices, such as patrol vehicle cameras and body mounted cameras, as a means of reducing liability and documenting evidence.

People come in all shapes and sizes. Because of that, a mounted position of a body mounted camera may vary on a person-by-person basis, in that a body mounted camera may be mounted at a different height and/or angle when mounted on each of a number of different people. However, in order to function properly, such a body camera must be mounted in a manner that it is able to capture images in front of the person on which it is mounted. In such body cameras, a mechanical solution for adjusting an angle at which the body camera is mounted may not be practical.

Furthermore, as people perform physical activities, body-mounted camera devices may be subjected to a number of movements that may reduce the quality of video captured by those image capture devices. Once more, a mechanical solution for adapting to such movements may not be practical.

SUMMARY

Techniques are provided herein for providing automatic adjustment of image selection during image generation. Within an image capture device, such as a body-mounted camera device, raw image data is collected by an image sensor that includes an array of photosites. A portion of that raw image data is selected to be included within an image that is generated by the image capture device. In some embodiments, information received from a number of positional sensors (e.g., accelerometers, gyroscopes, magnetometers, etc.) is used to determine an offset value to be applied during image selection. Particularly, the portion of the raw image data that is selected to be included in the generated image is adjusted based on the information received from the number of positional sensors. In some embodiments, adjustments may be made on a continuous basis as new information is received from the positional sensors in order to stabilize video that is generated by the image capture device.

In one embodiment, a method is disclosed as being performed by a body-mounted image capture device, the method comprising receiving raw image data that comprises information collected by an image sensor, receiving, at the image capture device, sensor data comprising information about a position of the image capture device, determining, based at least in part on the received sensor data, an offset value, selecting, based on the determined offset value, a portion of the raw image data to be included within an image, and generating the image from the portion of the raw image data.

An embodiment is directed to a computing device comprising: a processor; and a memory including instructions that, when executed with the processor, cause the computing device to receive raw image data that comprises information collected by an image sensor, receive sensor data comprising information about a position of the image capture device, determine, based at least in part on the received sensor data, an offset value, select, based on the determined offset value, a portion of the raw image data to be included within an image, and generate the image from the portion of the raw image data.

An embodiment is directed to a non-transitory computer-readable media collectively storing computer-executable instructions that upon execution cause one or more computing devices to perform acts comprising receiving raw image data that comprises information collected by an image sensor, receiving sensor data comprising information about a position of the image capture device, determining, based at least in part on the received sensor data, an offset value, selecting, based on the determined offset value, a portion of the raw image data to be included within an image, and generating the image from the portion of the raw image data.

Embodiments of the disclosure provide several advantages over conventional techniques. For example, embodiments of the proposed system provide for automatic adjustment of an image generated by an image capture device in order to optimize the utility of such an image. Embodiments of the disclosure provide a non-mechanical means of such image adjustment where implementation of a mechanical means may not be feasible. Additionally, embodiments of the disclosure provide for automatic stabilization of video captured using the image capture device. Such stabilization may be used to increase the quality of video when a user wearing the image capture device is moving or otherwise performing some physical activity.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
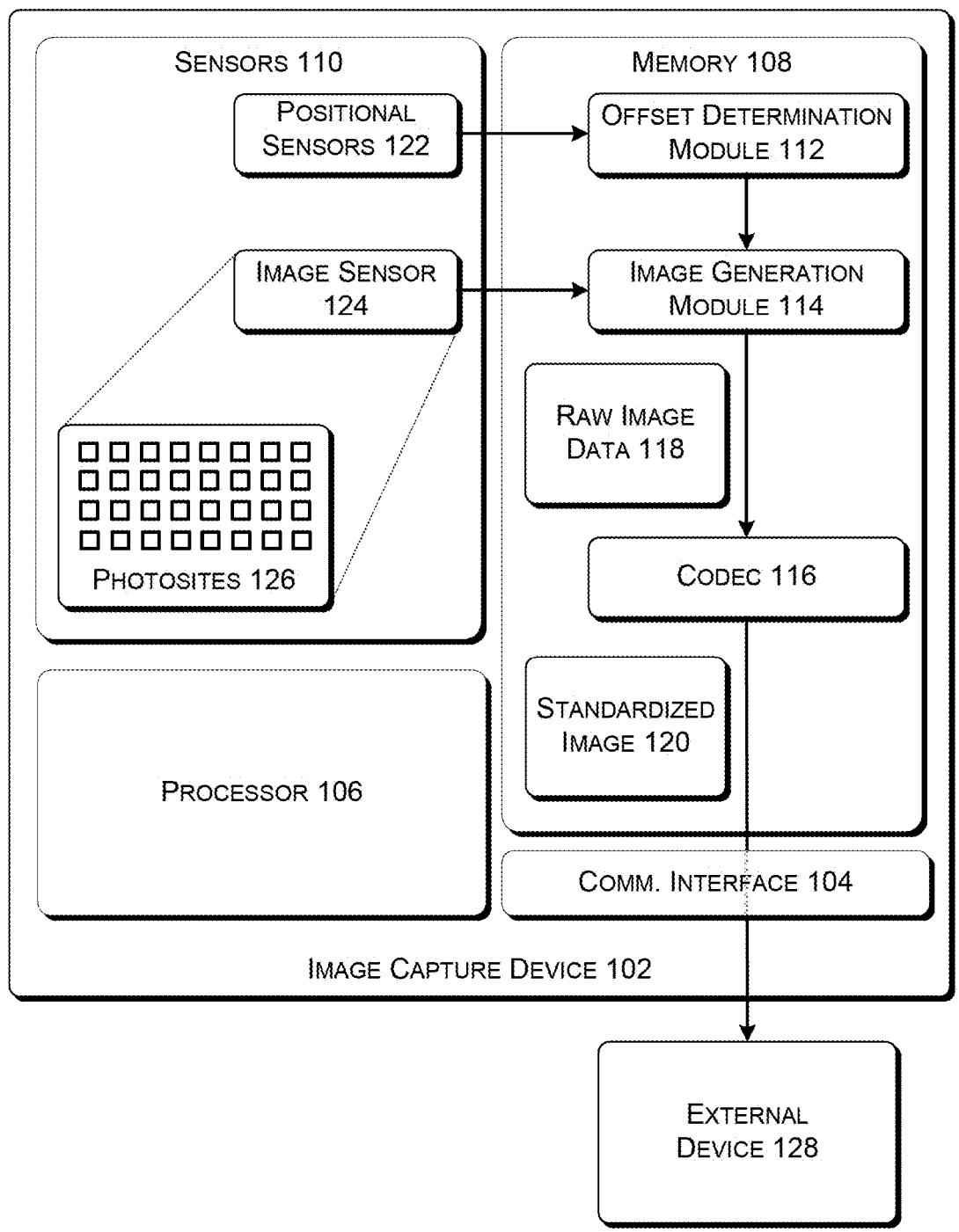
FIG. 1 is a block diagram showing various components of an example image capture device that supports image selection to correct for a positional offset in accordance with some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to adjust an image selection performed by an image capture device during image generation in order to account for a positional offset using non-mechanical means. In some embodiments, raw image data is obtained via an image sensor that comprises an array of photosites. The raw image data may include information received from each of the photosites and may be stored in any suitable format. The raw image data may include image information with one or more characteristics that exceed those required by a common and/or standardized image and/or video format. For example, the raw image data may include a greater number of pixels in the horizontal and/or vertical dimensions than are required by the format.

Information may be received from a number of positional sensors installed within the image capture device, each positional sensor capable of obtaining information about a current position of the image capture device. An offset value may be calculated based on a degree to which a current facing of the image capture device varies from an optimal facing based on the information received from the number of positional sensors. In some cases, the offset value may represent a number of pixels, or other suitable measurement, that is used during image generation to select a portion of the raw image data to be included in the image that is generated. Once such an offset value has been generated, an image may be generated based on that offset value. In some embodiments, a location of a point around which a portion of the raw image data is selected may be adjusted based on the offset value such that the portion of the raw image data is selected based on the new position. In some embodiments, the offset value includes multiple offsets, for example, a vertical offset and a horizontal offset.

Using the techniques described herein, an image capture device can be configured to automatically adjust the selection of imagery to be included within a generated image in order to optimize the quality of the obtained images and/or to conform to a standard image and/or video format. Additionally, in some embodiments, when sudden movements are detected by a wearer of the image capture device, an offset value may be used to counter those movements (at least partially) in order to smooth out the quality of the captured video. As will be apparent to one of skill in the art, techniques for selecting portions of raw image data to generate images may be applied over time to generate video, so that discussion below with respect to images applies also to video.

FIG. 1 is a block diagram showing various components of an image capture device that supports image selection to correct for a positional offset in accordance with embodiments. The image capture device 102 may include a communication interface 104, one or more processors 106, a memory 108, and a number of sensors 110. In some embodiments, the image capture device may further include a user interface that enables interaction between a user and the image capture device. For example, the user interfaces may include a data output device (e.g., visual display, audio speakers), and one or more data input devices. The data input devices may include, but are not limited to, combinations of one or more of keypads, keyboards, mouse devices, touch screens that accept gesture inputs, audio input (e.g., voice or speech input), and any other suitable user input type.

The image capture device 102 can include any suitable electronic device or combination of electronic devices configured to perform at least a portion of the operations described herein. In some embodiments, the image capture device may comprise a digital camera capable of capturing images (e.g., still images and/or video).

The communication interface 104 may include wireless and/or wired communication components that enable the image capture device to transmit or receive data via a network, such as the Internet, to a number of other electronic devices (e.g., data source 106). Such a communication interface 104 may include access to both wired and wireless communication mechanisms. In some cases, the image capture device transmits data to other electronic devices over a long-range communication channel, such as a data communication channel that uses a mobile communications standard (e.g., long-term evolution (LTE)).

The memory 108 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 106 and the memory 108 of the image capture device 102 may implement functionality from one or more software modules and data stores. Such software modules may include routines, program instructions, objects, and/or data structures that are executed by the processors 106 to perform particular tasks or implement particular data types. The memory 108 may include at least a module for determining a positional offset for the image capture device (e.g., offset determination module 112), a module for generating an image from captured raw image data using the determined positional offset (e.g., image generation module 114), and a module for compressing the generated image into a standardized format (e.g., codec). Additionally, the memory 108 may further include a portion of memory dedicated to the storage of image/video data captured by the image capture device. Particularly, this portion of memory may store raw image data 118 and standardized image data 120 obtained via a camera.

The sensors 110 may include any sensor devices capable of obtaining information about the image capture device. In some embodiments, such sensors may include both positional sensors 122 capable of collecting information about a position of the image capture device as well as at least one image sensor 124 capable of collecting raw image data.

In some nonlimiting examples. the positional sensors 122 may include a temperature sensor, a real-time clock (RTC), an inertial measurement unit (IMU), or any other suitable sensor. An IMU may be any electronic device that measures and reports a body's (e.g., the image capture device) specific force, angular rate, and sometimes the orientation of the body, using a combination of accelerometers, gyroscopes, and magnetometers.

An image sensor 124 would typically comprise a number of photosites 126, each of which collect information about light that strikes the respective photosite. The photosites may be arranged in an array comprised of rows and columns. Raw image data can be generated by compiling information collected from each of the photosites, such that information from each photosite may correspond to a pixel in the raw image data based on the respective position of the photosite within the array of photosites.

The offset determination module 112 may be configured to, in conjunction with the processor 106, determine an offset to be applied to the raw image data when generating an image from that data. Such an offset may correspond to a degree to which the image capture device is misaligned with an optimal facing. In some embodiments, the offset may be determined as a vertical offset (e.g., a degree to which the image is not being captured level with the ground) as well as a horizontal offset (e.g., a degree to which the image is not being captured relative to a facing of the person wearing the image capture device), or at least a direction in which the person is traveling. Such an offset may be determined based on sensor data received from the one or more positional sensors.

In some embodiments, an offset may be expressed as a degree or angle. In some embodiments, an offset may be translated into a number of pixels. For example, the offset determination module may determine that there is a 3° offset to the right in that the image capture device is currently aimed 3° off center to the left. In this example, the offset determination module may translate the 3° offset to an offset of +5 pixels.

The image generation module 114 may be configured to, in conjunction with the processor 106, select a portion of the data represented within the raw image data to be included within an image generated from that raw image data. In some embodiments, the image generation module may be configured to select an array of pixels from the raw image data to be included within a generated (e.g., standardized) image. In some cases, this may comprise selecting an array of pixels of a particular size to be included within the image (e.g., a number of pixels along an X-axis by a number of pixels along a Y-axis) based on a desired resolution and aspect ratio (e.g., 1024×720, etc.). While a requirement may exist that the relative positions of the pixels in such an array reflect the respective positions of information included in the raw image data, the image generation module may determine what raw image data is to be used. In some embodiments, the image generation module may be configured to select an array of pixels that is centered around a point defaulted to be at the center of the raw image data. This default point can be moved by some number of pixels along the X-axis or Y-axis (e.g., left, right, up, or down) within the raw image data based on an offset value determined by the offset determination module while keeping the selection of pixels the same size.

The codec 116 may be configured to, in conjunction with the processor 106, convert the raw image data 118 captured via the image sensor into a standardized image 120. A standardized image is one that conforms with one or more image standard formats set forth by a third-party entity (e.g., a standards organization). Such standardized images may be compressed using lossy or lossless compression techniques. Some nonlimiting examples of suitable standard formats for images may include JPEG/JIFF, Exif, TIFF, GIF, BMP, PNG, WebP, or any other suitable format. An image or video in a standard format may include frames having specified dimensions. In some cases, a video or imagery in a standard format may include frame dimensions having less horizontal and/or vertical pixels than are included in the raw image data. In some embodiments, the raw image data may be stored in an encrypted and/or proprietary format.

Once a standardized image has been generated by the image capture device, that standardized image may be provided to an external device 128. Such an external devices may comprise any suitable electronic device capable of receiving the standardized image (e.g., via the communication interface 104). The standardized image may be transmitted to the external device via a wired or wireless connection. In some embodiments, the standardized image may be transmitted to the external device in substantial real-time (e.g., as the image is captured). For example, the standardized image may comprise streaming video imagery that is provided in real-time to a remote server (e.g., the external device).

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
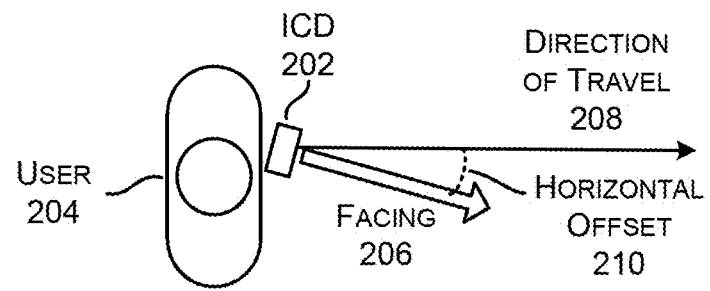
FIG. 2 depicts an illustrative example of an offset that may be determined for a body-mounted image capture device in accordance with some embodiments.
Figure 2:
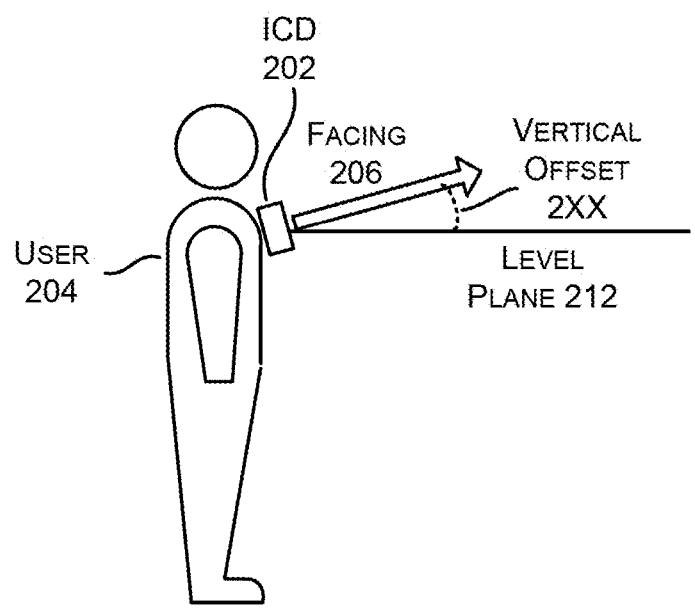

FIG. 2 depicts an illustrative example of an offset that may be determined for a body-mounted image capture device in accordance with some embodiments. As depicted in FIG. 2, an image capture device (ICD) 202 may be mounted on a person 204. When mounted, the image capture device 202 is configured to capture images of an area directly in front of its camera. The images captured by the image capture device are dependent upon a facing 206 of the image capture device, which may be further dependent upon a position in which the image capture device is mounted on the person. A facing 206 of the image capture device may include both a horizontal and vertical component.

As noted elsewhere, the image capture device may include a number of positional sensors (e.g., positional sensors 122 as described with respect to FIG. 1) capable of obtaining and providing information on a position in which the image capture device is mounted. Such positional information may be used to determine a direction in which the image capture device is aimed. For example, a direction in which the image capture device is aimed may be determined based on one or more readings obtained from a magnetometer sensor. In this example, the readings may indicate a direction of the earth's magnetic field with respect to the image capture device and a horizontal component of the facing of the image capture device may then be determined based on the determined direction of the earth's magnetic field.

In some embodiments, a direction of travel 208 may be determined for the image capture device. In some cases, a direction of travel may be determined based on a change in coordinates as determined via a global positioning system (GPS) sensor located within the image capture device. In some cases, a direction of travel may be determined based on readings received from one or more gyroscope and/or accelerometer sensors. For example, a direction of travel may be determined to correspond to a direction in which the image capture device has been determined to most often, or most recently, accelerate.

A comparison may be made between the facing 206 of the image capture device against the direction of travel of the image capture device. A variance may be identified between the direction of travel and the facing based on this comparison. This variance may then be used to calculate a horizontal offset for the image capture device. In some embodiments, the horizontal offset may be determined as an angle that comprises a number of degrees difference between the determined direction of travel and the current facing. Such an angle may be translated into a number of pixels or some other suitable indication of an amount by which an image selection may be adjusted.

Additionally, in some embodiments, variance may be determined between a vertical facing of the image capture device and a level plane 212. A level plane may represent a plane that lies parallel to a horizon. In some cases, such a variance may be determined based on information obtained via a gyroscope sensor installed within the image capture device. This variance may then be used to calculate a vertical offset for the image capture device. In some embodiments, the vertical offset may be determined as an angle that comprises a number of degrees difference between the level plane and the current facing. Such an angle may be translated into a number of pixels or some other suitable indication of an amount by which an image selection may be adjusted.

In some embodiments, an offset value may be generated that includes components comprised of both the horizontal offset and the vertical offset as determined above. In some embodiments, such an offset value may be generated in an X:Y format, where X represents a determined horizontal offset and Y represents a determined vertical offset.

Figure 3:
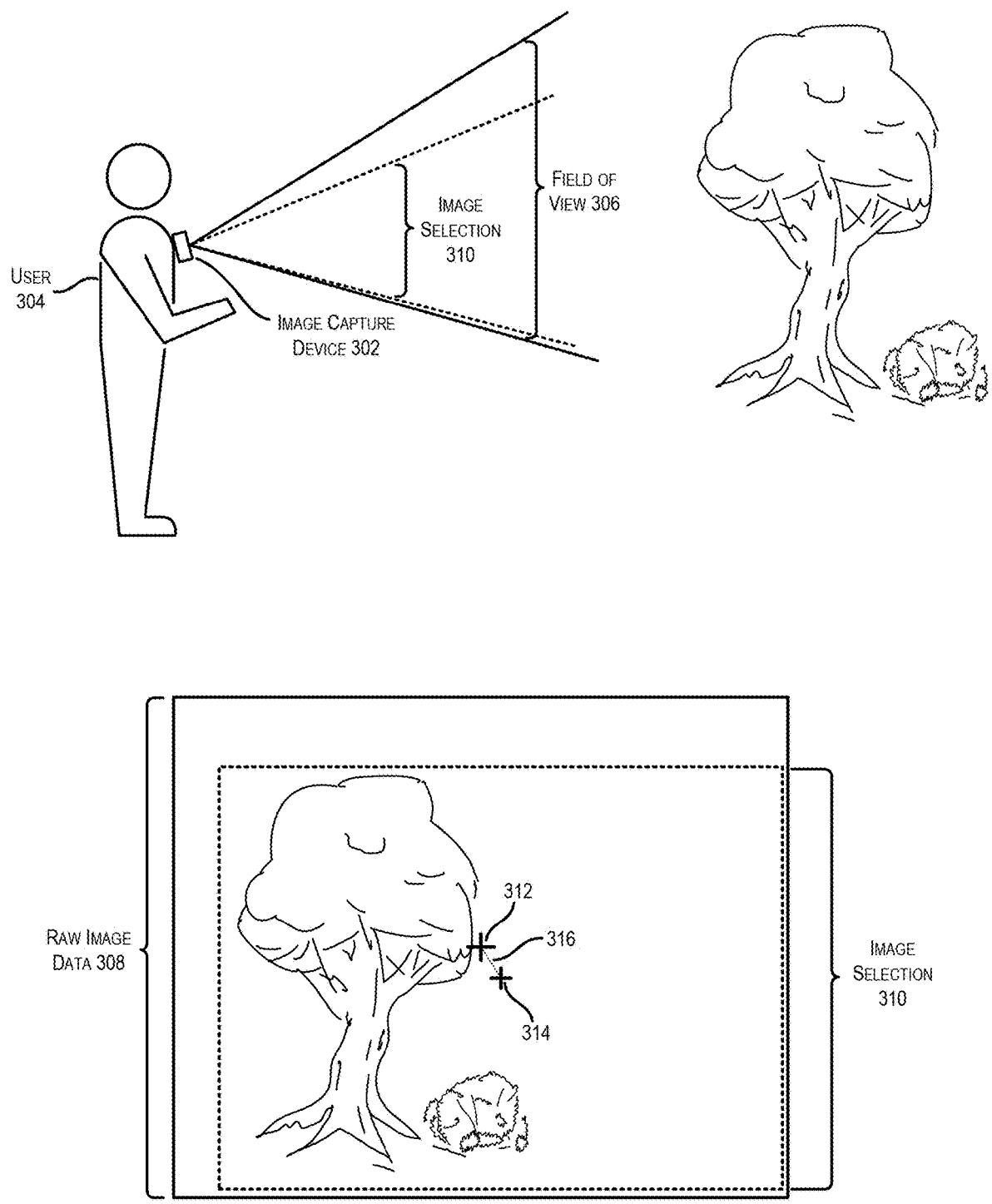
FIG. 3 depicts an illustrative example of an image data selection process that may be performed within an image capture device to create a standardized image from raw image data in accordance with some embodiments.

FIG. 3 depicts an illustrative example of an image data selection process that may be performed within an image capture device to create a standardized image from raw image data in accordance with embodiments. As depicted in FIG. 3, an image capture device 302 may be mounted on a person 304. When mounted, such an image capture device is configured to capture images of an area directly in front of its camera, which is referred to as a field of view 306 of the camera.

Raw image data 308 is generated from the camera's field of view using an image sensor installed within the camera. Raw image data is represented as a 2 dimensional space having an X-axis and a Y-axis. The raw image data comprises information collected and aggregated from a number of photosites. In some embodiments, the information obtained from each photosite corresponds to a pixel within the raw image data. Accordingly, the raw image data may be composed of a total number of pixels that corresponds to a total number of photosites in an array of photosites of the image sensor.

During the generation of an image from the raw image data, an image generation module may select a contiguous portion of the raw image data to be included within the generated image, referred to as image selection 310. This contiguous portion of the raw image data may be of a particular size, in that it is to include a specified number of pixels along both an X-axis and Y-axis. The selection of which contiguous portion of the raw image data to be used to generate such an image is made based on a determined offset as described herein. To make such a determination, a point within the raw image data may be identified around which the selection is centered. Initially, such a point may comprise a default point 312 located at the center of the raw image data 308 such that the image selection would initially include the contiguous portion of data located within the center of the raw image data. However, upon receiving an indication of an offset value to be applied to the image selection, an offset point 314 may be identified that is positioned away from the default point 312 by the indicated offset value 316. The portion of raw data selected to be included within the generated image may then be selected based on its being positioned such that the offset point is at the center of the image selection.

In some embodiments, one or more of the horizontal and/or vertical offset values may be determined to result in an image selection being outside of the raw image data. For example, the determined offset value may include a horizontal offset value component that, if implemented, would place the rightmost side of the image selection beyond the rightmost side of the raw image data. In this case, the offset value may have a maximum value that allows for image selection up to the edge of the raw image data.

By way of illustration, consider a scenario in which the image selection is to be of a size of 1200 pixels wide (i.e., along the X-axis). In this illustration, the raw image data may include image data that is 1600 pixels wide. Accordingly, if image data in this scenario is selected from the center of the raw image data, then the raw image data would include a space of 200 pixels on each side that is not included in the image. This also means that the maximum that the image selection could be moved in either direction within the raw image data along the X-axis is 200 pixels. In this scenario, if an offset is determined as being greater than the maximum (e.g., 250 pixels) to the right, then an offset of 200 pixels may be applied such that the image selection includes image data from the rightmost edge of the raw image data and 1200 pixels to the left of that.

Figure 4:
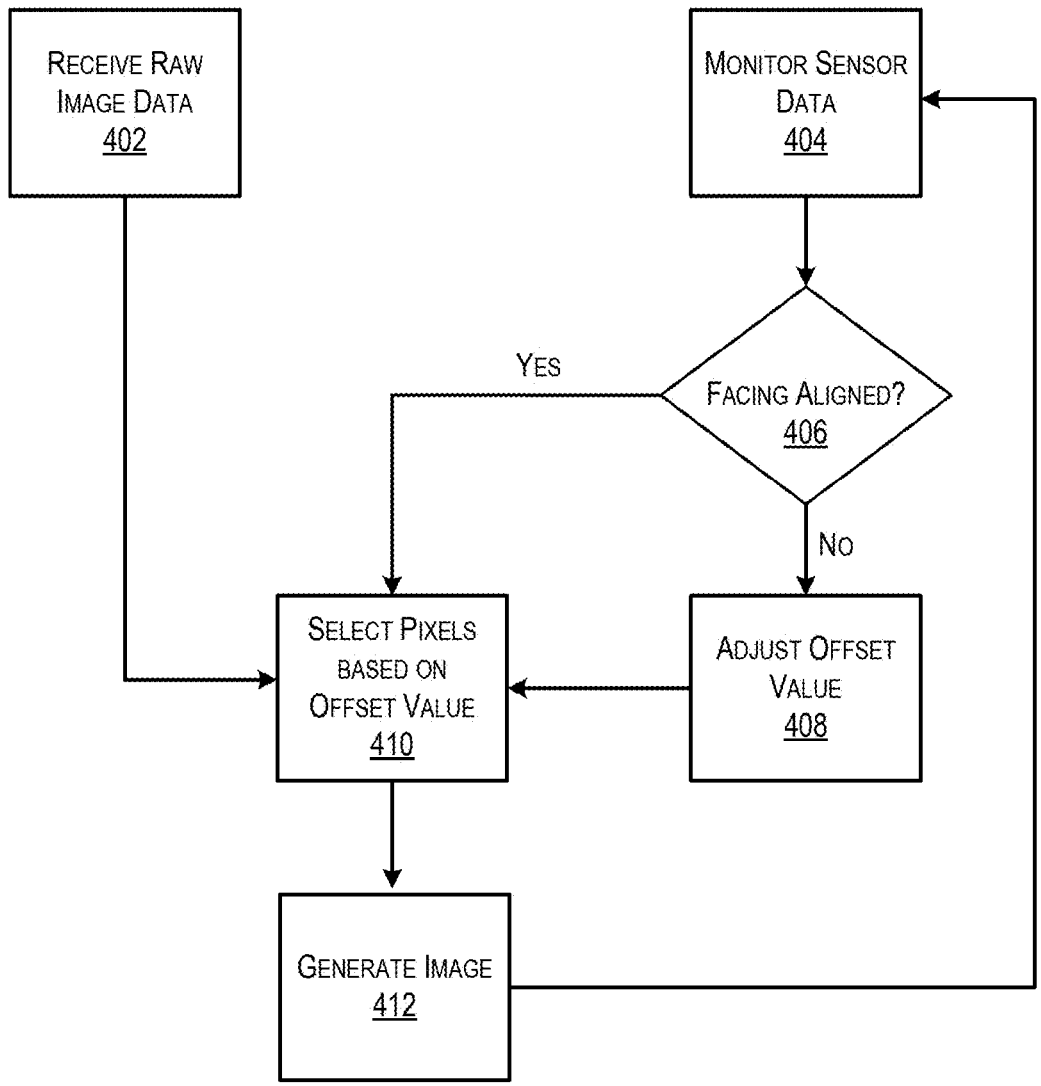
FIG. 4 depicts a block diagram showing an example process flow for providing continuous automated adjustment of image data generation in accordance with some embodiments.

FIG. 4 depicts a block diagram showing an example process flow for providing continuous automated adjustment of image data generation in accordance with embodiments. The process 400 involves interactions between various components of an image capture device 100 described with respect to FIG. 1. More particularly, the process 400 involves interactions between at least an image sensor 124, one or more positional sensors 122, an offset determination module 112, and an image generation module 114. In some embodiments, the process 400 provides for continuous adjustment of an image generated within streaming video, resulting in the generation of a more stable video.

At 402 of the process 400, raw image data is received from an image sensor of the image capture device. As noted elsewhere, such raw image data may include information received from an array of photosites within the image sensor. The raw image data may comprise a two dimensional (2D) representation of an area located in a field of view of the image sensor. The 2D representation may comprise an array of pixels along an X-axis and a Y-axis.

At 404 of the process 400, sensor data collected by one or more positional sensors installed in the image capture device may be monitored. Such sensor data may include information received from one or more of accelerometers, gyroscopes, magnetometers, GPS devices, or other suitable sensors capable of detecting a change in position (e.g., pose or location) of the image sensor device.

At 406 of the process 400, a determination may be made as to whether a current facing of the image capture device is aligned with an optimal facing. In some embodiments, this may comprise determining whether the image capture device is currently level (e.g., with respect to gravity) using information obtained from a gyroscope sensor installed within the image capture device. In some embodiments, this may comprise determining whether a current facing of the image capture device is aligned with a direction in which the image capture device is traveling. For example, information received from an accelerometer and/or GPS may be used to determine a degree to which the facing of the image capture device is aligned with a direction in which the image capture device is traveling or accelerating. In some embodiments, a direction of travel for the image capture device may be determined based on information received from one or more sensors over a predetermined amount of time (e.g., over the last thirty seconds, over the last minute, over the last five minutes, etc.).

In some embodiments, a mounting event may be detected via the information received from one or more positional sensors of the image capture device. A mounting event may correspond to the image capture device being mounted, or put on, by a user. Such an event may be detected via one or more patterns identified from the received sensor data. In at least some of these embodiments, upon detecting the occurrence of a mounting event, a new offset value may then be determined from sensor information received over a predetermined period of time. In at least some of these embodiments, an offset value may be calculated once upon detecting a mounting event. Such an offset value may be applied to image selection until a new mounting event is detected or the recording device is turned off.

At 408 of the process 400, an offset value may be adjusted upon making a determination that a current facing of the image capture device is not aligned with an optimal facing ("No" from decision block 406). In some embodiments, an image capture device may maintain, in its memory, a current offset value that is applied to image selection during image generation. This stored offset value may be adjusted as new information is received. In some cases, a default offset value may overwrite the stored offset value when the image capture device is turned on or mounted. Upon making a determination that a current facing of the image capture device is aligned with an optimal facing ("Yes" from decision block 406), the process 400 may continue to 410 without any adjustment to the current offset value.

In some cases, the image capture device may detect a sudden change in its position. For example, a sudden acceleration or deceleration may be detected via acceleration information obtained by accelerometers. In another example, a sudden change in position around a rotational axis may be detected via information obtained by a gyroscope. In these cases, an offset value may be adjusted automatically to counter the sudden movement, which can help to smooth out the captured video. For example, when a person that is wearing the image capture device begins to run, this will result in alternating accelerations and decelerations in an up and down direction. In this example, an offset may be adjusted downward during an acceleration in an upward direction and adjusted upward during an acceleration in a downward direction. This can help to level out the video that is being captured by the image capture device by softening the upward and downward movement that would typically be applied to the generated video.

At 410 of the process 400, a portion of the raw image data is selected for inclusion within an image to be generated. The portion that is selected is less than the entirety of the raw image data and may be of a particular size. For example, the portion may comprise a square that includes a first number of pixels along the X-axis and a second number of pixels along the Y-axis. In some embodiments, the portion of raw image data that is selected for inclusion in an image may be selected by virtue of its position with respect to a particular point within the raw image data. In some embodiments, such a point may comprise an offset point that is determined by adjusting a default point (e.g., a point at the center of the raw image data) based on the current offset value.

At 412 of the process 400, an image is generated from the selected portion of raw image data. In some embodiments, an image may be generated using a video/image codec configured to encode or decode a digital data stream or signal. The codec receives the selected portion of the raw image data and translates that received portion of data into an image/video in a standardized format, such that it is made accessible via a media player outside of the image capture device.

In some embodiments, the image generated at block 412 may comprise a frame within a video being generated by the image capture device. In these embodiments, sensor data received by the image capture device may be continuously monitored and an offset value may be continuously adjusted based on the received sensor data. Accordingly, the selection of pixels from the raw image data to be included within the video may change in real-time as corresponding sensor data is received indicating a change in the position of the image capture device.

Figure 5:
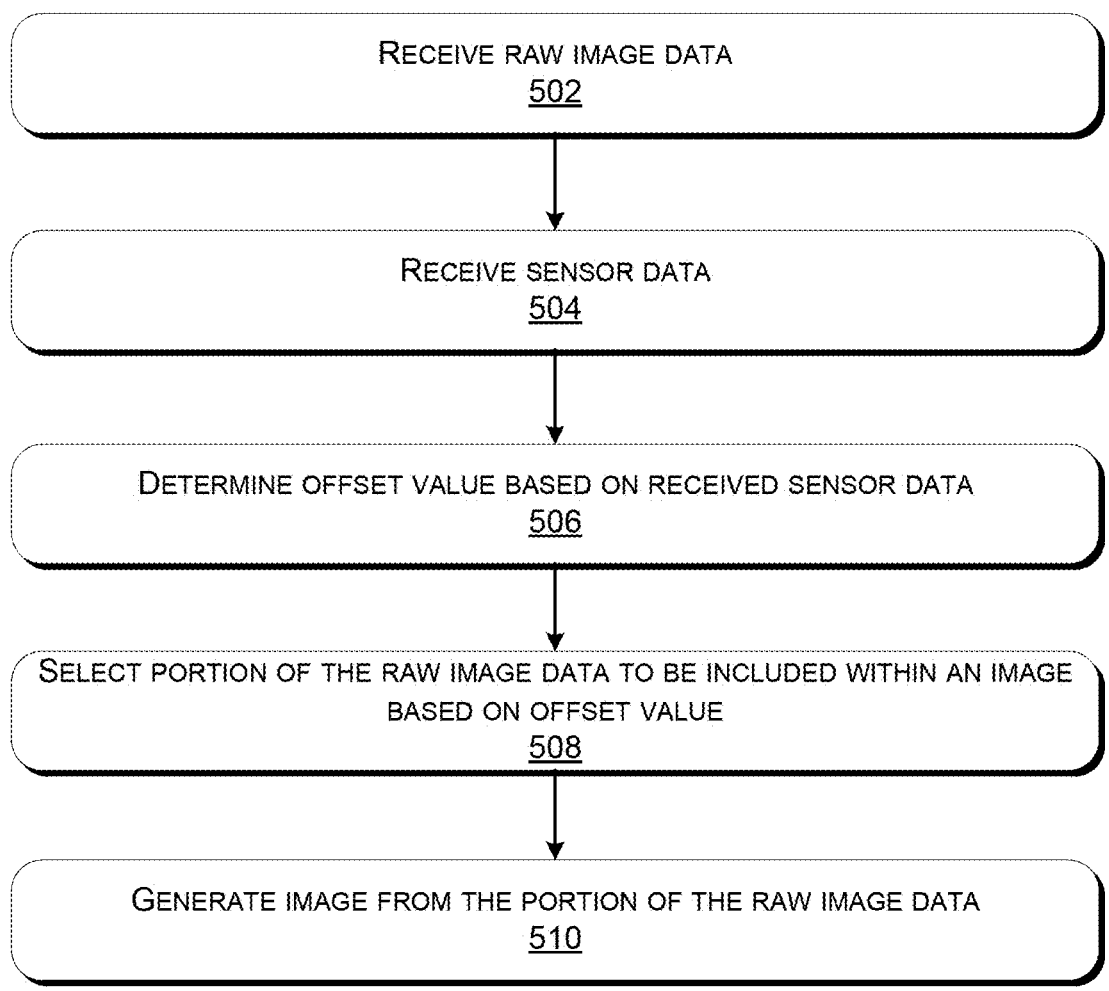
FIG. 5 depicts a block diagram showing an example process flow for a process of automatically adjusting image selection for an image generated from captured raw image data in accordance with some embodiments.

FIG. 5 depicts a block diagram showing an example flow for a process of automatically adjusting image selection for an image generated from captured raw image data in accordance with embodiments. The process 500 may be performed by components within an image capture device 102 as discussed with respect to FIG. 1 above.

At 502, the process 500 comprises receiving raw image data from an image sensor installed within the image capture device. In embodiments, the image sensor comprises an array of photosites. Each of the photosites in such an array of photosites corresponds with a pixel in the raw image data. In some embodiments, the raw image data is stored as obscured data. For example, the raw image data may be stored as at least one of encrypted data or data in a proprietary format.

At 504, the process 500 comprises receiving sensor data from one or more positional sensors installed within the image capture device. In some embodiments, the one or more positional sensors may comprise one or more of accelerometers, gyroscopes, magnetometers, or GPS devices.

At 506, the process 500 comprises determining an offset value based on the received sensor data. Such an offset value represents a degree to which a current facing of the image capture device is aligned with an optimal facing of the image capture device. In some embodiments, the offset value comprises each of a horizontal and a vertical component. In some cases, a horizontal component of the offset value may represent a degree to which a current facing of the image capture device is misaligned with a direction of travel and/or acceleration of the image capture device. In some cases, a vertical component of the offset value may represent a degree to which a current facing of the image capture device is misaligned with a level plane. In some embodiments, one or more component of the offset value is represented as an angular degree. In some embodiments, one or more component of the offset value is represented as a number of pixels. In some cases, each angular degree may correspond to a particular number of pixels.

At 508, the process 500 comprises selecting a portion of the raw image data to be included within an image based on the determined offset value. In some embodiments, the image comprises a frame within a video. In these embodiments, the offset value may be continuously adjusted throughout the video (e.g., on a frame-by-frame basis) based on information received via the positional sensors while capturing the video.

At 510, the process 500 comprises generating the image from the portion of the raw image data. In some embodiments, the image is generated from the portion of the raw image data using a codec configured to translate images into a standard format. Once generated, the image may be provided to at least one external device. In at least some of these embodiments, the image is generated in a standard format that is accessible using a commonly available media player application.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
receiving, at an image capture device, raw image data that comprises information collected by an image sensor;
receiving, at the image capture device, sensor data comprising information about a position of the image capture device;
determining, based at least in part on the received sensor data, an offset value comprising a horizontal component and a vertical component, the horizontal component determined based on a difference between a current facing of the image capture device and a direction of travel of the image capture device, the vertical component determined based on a difference between the current facing of the image capture device and a level plane;
selecting, based on the determined offset value, a portion of the raw image data to be included within an image or video; and
generating the image from the portion of the raw image data.

2. The method of claim 1, wherein the offset value represents a degree to which a current facing of the image capture device is aligned with an optimal facing of the image capture device.

3. The method of claim 1, wherein the offset value is represented as an angular degree.

4. The method of claim 1, wherein the offset value is represented as a number of pixels.

5. The method of claim 1, further comprising providing the generated image to at least one external device.

6. The method of claim 1, wherein the image sensor comprises an array of photosites.

7. The method of claim 1, wherein the raw image data is stored as obscured data and the image is generated in a standard format.

8. The method of claim 7, wherein the obscured data comprises at least one of encrypted data or data in a proprietary format.

9. A computing device comprising:
an image sensor;
a processor; and
a memory including instructions that, when executed with the processor, cause the computing device to, at least:
receive raw image data that comprises information collected via the image sensor;
receive sensor data comprising information about a position of the image capture device;
determine, based at least in part on the received sensor data, an offset value comprising a horizontal component and a vertical component, the horizontal component determined based on a difference between a current facing of the image capture device and a direction of travel of the image capture device, the vertical component determined based on a difference between the current facing of the image capture device and a level plane;
select, based on the determined offset value, a portion of the raw image data to be included within an image; and
generate the image from the portion of the raw image data.

10. The computing device of claim 9, wherein the image comprises a frame within a video.

11. The computing device of claim 10, wherein the offset value is continuously adjusted while the raw image data associated with the video is being captured.

12. The computing device of claim 9, wherein selecting the portion of the raw image data to be included within the image comprises selecting a number of pixels in proximity to an offset point.

13. The computing device of claim 9, wherein the portion of the raw image data to be included within the image comprises an array of pixels, the array being a predetermined size.

14. The computing device of claim 9, wherein the image is generated from the portion of the raw image data using a codec configured to translate images into a standard format.

15. A non-transitory computer-readable media collectively storing computer-executable instructions that upon execution cause one or more computing devices to collectively perform acts comprising:
receiving raw image data that comprises information collected by an image sensor;
receiving sensor data comprising information about a position of the image capture device;
determining, based at least in part on the received sensor data, an offset value comprising a horizontal component and a vertical component, the horizontal component determined based on a difference between a current facing of the image capture device and a direction of travel of the image capture device, the vertical component determined based on a difference between the current facing of the image capture device and a level plane;
selecting, based on the determined offset value, a portion of the raw image data to be included within an image; and
generating the image from the portion of the raw image data.

16. The computer-readable media of claim 15, wherein the instructions further cause the one or more computing devices to:
receive a second sensor data comprising information about a second position of the image capture device; and
adjust the offset value based on the second sensor data.

17. The computer-readable media of claim 16, wherein the instructions further cause the one or more computing devices to generate at least one second image based on the adjusted offset value.

\* \* \* \* \*